United States Patent
Katz

(10) Patent No.: US 9,945,409 B2
(45) Date of Patent: Apr. 17, 2018

(54) CORNER MEMBER, CORNER ASSEMBLY, CONSTRUCTION KIT AND RECTANGULAR STRUCTURE

(71) Applicant: Tri-Mech Design Inc., Victoria (CA)

(72) Inventor: Rodney Katz, Victoria (CA)

(73) Assignee: Tri-Mech Design Inc., Victoria BC (CA)

( * ) Notice: Subject to any disclaimer, the term of this patent is extended or adjusted under 35 U.S.C. 154(b) by 155 days.

(21) Appl. No.: 15/055,388

(22) Filed: Feb. 26, 2016

(65) Prior Publication Data
US 2016/0252208 A1 Sep. 1, 2016

Related U.S. Application Data

(60) Provisional application No. 62/121,859, filed on Feb. 27, 2015.

(51) Int. Cl.
| | |
|---|---|
| *F16B 12/02* | (2006.01) |
| *A47B 57/46* | (2006.01) |
| *A47B 96/06* | (2006.01) |
| *A47B 96/14* | (2006.01) |

(52) U.S. Cl.
CPC .............. *F16B 12/02* (2013.01); *A47B 57/46* (2013.01); *A47B 96/1416* (2013.01); *A47B 96/1466* (2013.01); *A47B 96/1483* (2013.01); *A47B 96/068* (2013.01)

(58) Field of Classification Search
CPC ......... A47B 57/32; A47B 57/34; A47B 57/44; A47B 57/46; A47B 96/061; A47B 96/068; A47B 96/1416; A47B 96/1483; A47B 47/045; A47B 96/1466; A47B 96/062; F16B 12/02

USPC ........... 108/147.12, 147.13, 147.14, 147.15, 108/147.17; 312/140; 248/220.1
See application file for complete search history.

(56) References Cited

U.S. PATENT DOCUMENTS

| | | | | |
|---|---|---|---|---|
| 967,383 | A | * 8/1910 | Hunter ................. | A47B 96/022 248/220.1 |
| 2,942,924 | A | * 6/1960 | Stangert ................. | A47B 21/03 108/27 |
| 3,085,841 | A | * 4/1963 | Snyder ................... | F16B 12/50 312/140 |

(Continued)

FOREIGN PATENT DOCUMENTS

| | | | | |
|---|---|---|---|---|
| GB | 1065942 | * | 4/1967 | .............. F16B 12/02 |
| GB | 2040672 | * | 9/1980 | ......... A47B 47/0008 |

(Continued)

*Primary Examiner* — Michael Safavi
(74) *Attorney, Agent, or Firm* — Baumgartner Patent Law; Marc Baumgartner

(57) ABSTRACT

An extruded corner bracket is provided, the corner bracket comprising a length; a body extending the length; a pair of wings extending the length and extending outward from the body to define, with the body, an outer right angle and a pair of inner right angles, the inner right angles being normal to each other, each inner right angle having a first face and a second face; and a slot within the body and extending the length, the slot for slidably, non-rotatably retaining a nut and for housing a distal end of a bolt, the slot including an elongate opening defined by a distal edge of each first face. A corner bracket assembly, rectangular structures using the corner bracket assembly and a kit are also provided.

17 Claims, 13 Drawing Sheets

(56) References Cited

U.S. PATENT DOCUMENTS

| | | | | |
|---|---|---|---|---|
| 3,981,250 A * | 9/1976 | Anthony | ............... | A47B 57/26 |
| | | | | 108/106 |
| 3,981,251 A | 9/1976 | Damberg | | |
| 4,126,364 A * | 11/1978 | Reilly | ..................... | F16B 12/50 |
| | | | | 312/140 |
| 4,556,148 A * | 12/1985 | Koller | ............... | A47B 47/0008 |
| | | | | 211/182 |
| 4,589,792 A | 5/1986 | Niziol | | |
| 4,621,879 A * | 11/1986 | Schneider | ............... | A47B 43/00 |
| | | | | 312/140 |
| 4,645,276 A * | 2/1987 | Flavigny | ............... | A47B 57/44 |
| | | | | 108/107 |
| 5,345,737 A * | 9/1994 | Latchinian | ........... | A47B 57/565 |
| | | | | 403/172 |
| 5,425,520 A | 6/1995 | Masumoto | | |
| 5,464,185 A | 11/1995 | Hensley | | |
| 5,503,471 A * | 4/1996 | Aspenwall | ............. | A47B 57/26 |
| | | | | 312/114 |
| 6,067,760 A | 5/2000 | Nowell | | |
| 6,082,837 A * | 7/2000 | Battochio | ........... | G09F 15/0068 |
| | | | | 312/140 |
| 6,223,917 B1 * | 5/2001 | Bruder | ............... | A47B 47/0008 |
| | | | | 211/182 |
| 6,419,205 B1 | 7/2002 | Meendering | | |
| 6,527,236 B1 | 3/2003 | Situ | | |
| 6,813,862 B2 | 11/2004 | Perich | | |
| 6,854,239 B2 | 2/2005 | White | | |
| 7,896,177 B1 * | 3/2011 | Toma | ................. | A47B 47/0008 |
| | | | | 108/147.17 |
| 2004/0005189 A1 * | 1/2004 | Hor | ........................ | A47B 47/00 |
| | | | | 403/382 |
| 2007/0151197 A1 * | 7/2007 | Home | ............... | A47B 96/1466 |
| | | | | 52/656.1 |
| 2015/0308476 A1 * | 10/2015 | Black | .................... | F16B 5/0614 |
| | | | | 403/205 |

FOREIGN PATENT DOCUMENTS

| | | | | |
|---|---|---|---|---|
| GB | 2040672 A | * | 9/1980 | ........... A47B 7/0008 |
| WO | WO2017062745 | * | 4/2017 | ............... F16B 12/10 |

* cited by examiner

CORNER MEMBER, CORNER ASSEMBLY, CONSTRUCTION KIT AND RECTANGULAR STRUCTURE

CROSS REFERENCE TO RELATED APPLICATIONS

This application is related to, and claims the benefit of, U.S. Provisional Patent Application No. 62/121,859, entitled CORNER MEMBER, CORNER ASSEMBLY, CONSTRUCTION KIT AND RECTANGULAR STRUCTURE and filed 27 Feb. 2015. The above-identified priority patent application is incorporated herein by reference in its entirety.

FIELD

The present technology is a corner assembly for structures. More specifically, it is an extruded member into which planar materials are slotted and retained. A kit is also provided.

BACKGROUND

There are numerous structures that utilize corner brackets in their construction. These include shelving units, frames, and various rectangular structures.

A wide range of corner bracket designs have been patented. For example, U.S. Pat. No. 6,813,862 discloses a corner bracket assembly for use in an associated movable frame assembly. The corner bracket assembly includes a first housing piece having upstanding coupling pins. A second housing piece has receiving pockets for connecting engagement with the coupling pins and defining a cavity therebetween. A roller assembly is received within the cavity. The roller assembly includes a roller housing, a threaded engaging portion defined in the roller housing, and a roller rotatably mounted within the roller housing. A threaded fastener is rotatably mounted between the first and second housing pieces and is in threaded engagement with the roller assembly. A track is defined between the first and second housing pieces and the roller assembly for linearly adjusting a position of the roller assembly in relation to the first and second housing pieces.

U.S. Pat. No. 6,527,236 discloses a corner bracket comprising of two matching components held together by two bolts wherein as the two bolts are tightened, the two matching components will be urged toward each other thereby securely gripping a planar surface that is inserted between them. Another bolt is inserted through an opening in the second component through a threaded hole in the first component and protrudes into a hole in the first component where the vertical supporting member is inserted. The bolt will securely lock the corner bracket with the planar surface to the vertical supporting member inserted through the hole in the first component.

U.S. Pat. No. 6,419,205 discloses a bracket for use with a system of forms for holding poured concrete forming concrete walls. The bracket is used to hold the forms at corners of the system when the concrete walls change directions. The corner bracket includes formations to hold the wall panels in place at the corner.

U.S. Pat. No. 6,067,760 discloses a corner bracket used with a window or sliding glass door assembly to form a corner joint connecting frame members together which hold the glass and weather insulation in place. The corner bracket includes a body which has a front side and a back side connected by a connecting wall. The corner body includes a first end and a second end, where the second end is oriented approximately normal to the first end. The first and second ends include a pair of channels, a pair of L-shaped members spaced from the channels, and a finger extending from the connecting wall. The corner can also include a groove portion which engages a securing wall for the window. The corner can also include a protrusion which engages a weather insulation strip. The channels are detachably received by slots in a frame member. The L-shaped members and the finger are detachably received by openings in the frame member.

U.S. Pat. No. 5,464,185 discloses a corner bracket that comprises a corner piece and an integrally attached pin. In one embodiment, the corner piece is a single, integrally-formed molded plastic piece having front and rear walls joined by sidewalls. The pin may be made from metal and be molded into the juncture between the sidewalls. The molded-in end of the pin extends inwardly nearly to the front face of the corner piece. The pin may also be molded plastic integrally molded with the corner piece. In either case, the pin projects from the rear face and terminates in a pointed end for attachment to a vertical surface. The corner piece defines a slot dimensioned to receive a corner portion of an object to be mounted, such as a mat frame. In another embodiment, the front and rear walls of the corner piece are attached to each other by a hinge. The walls and the hinge are preferably integrally molded from plastic. Edge portions of the front and rear walls are provided with snap-together interlocking portions. When the walls are moved together into a closed position, the interlocking portions hold them together and they grip a corner portion of an object, such as a poster.

U.S. Pat. No. 5,425,520 discloses a corner bracket. On a side face of a corner bracket are formed a common insertion hole for a bolt, a stepped portion having a contact face and a contact edge which come to contact with a side wall of a strut and a side board of a shelf board, a strut projected portion engageable with an engaging hole defined in the side wall of the strut, and a board projected portion engageable with an engaging hole defined in the side board of the shelf board. The stepped portions are formed so as to extend entirely over a lower portion of the side face and to project outward. The side face of the corner bracket extends outside a line connecting between the strut projected portion and the board connecting portion formed thereon. Accordingly, the corner bracket is capable of reinforcing effectively a joint portion of the shelf board and the strut in a simple construction, and of preventing effectively an undesirable shaking of this joint portion.

U.S. Pat. No. 4,589,792 discloses an apparatus for and method of forming any selected one of a plurality of different articles of furniture, such as seating, storage, and sleeping units comprising a plurality of panels each having inner and outer faces terminating in a perimetrical edge, and mechanism for detachably coupling any selected number of panels together in angular relation such that the perimetrical edge of each panel is positioned inwardly of the outer face of an adjacent angularly related panel and the outer face of each panel is positioned outwardly of the perimetrical edge of the adjacent angularly related panel to provide outwardly opening openings adjacent the adjacent perimetrical edges of adjacent panels. One aspect of the invention includes a corner coupling bracket for coupling adjacent angularly related panels to form outwardly opening openings at the adjacent ends of adjacent panels.

U.S. Pat. No. 6,854,239 discloses a unitized corner brace for attachment to the corner of a structure. The unitized corner brace comprises a central portion having an edge and a right angle; two spaced apart tabs extending from the edge, each tab having a stepped portion proximal to the edge and stepped towards each other, the right angle being between the spaced apart tabs such that the tabs are perpendicular to each other; and, opposed bracket portions extending from the central portion. A method of manufacturing a unitized corner brace from a single piece of material and a stackable structure made using a unitized corner brace are also disclosed.

U.S. Pat. No. 3,981,251 discloses a knock-down shelving unit comprising a plurality of rectangular sheet metal shelves supported by vertical posts having a substantially rectangular cross-section, but in two adjacent corners being provided with groove-like deformations with spaced holes to secure the shelves in selected levels by means of screws. Each shelf has box-like flange portions in the adjoining open ends of which are inserted protecting plastics plates interconnected by a flexible central portion with a guide opening for a screw to be screwed through a mounting device extending obliquely between the two flange portions near the ends thereof.

None of the foregoing provide an easy to manufacture, easy to assemble corner member that can be used with a range of different materials to construct a range of different structures. What is needed is an easy to manufacture and easy to use corner member that can provide support and rigidity to a wide range of structures. It would be advantageous if the assembly was designed to allow an individual to assemble structures without the assistance of others. It would be advantageous if different lengths and combinations could be used to provide differing heights and could be use to link various structures together. It would be of further advantage if the corner member could accept different thicknesses and different compositions of planar materials. Still further, it would be advantageous if the corner member was provided as an assembly. If specific structures were sought, it would be of a further advantage to provide kits for those structures. These might include boxes, planters, benches and the like.

SUMMARY

The present technology provides an easy to manufacture and easy to use corner member that provides support and rigidity to a wide range of structures, ranging from boxes, planters, benches and the like. The corner member can accept and support different lengths and combinations of planar materials to provide differing heights and to link various structures together. The corner member can accept different thicknesses and different compositions of planar materials. The corner member can be provided as an assembly by including blocks and fasteners. It can also be provided as part of a kit.

In one embodiment, an extruded corner bracket is provided, the corner bracket comprising a length; a body extending the length; a pair of wings extending the length and extending outward from the body to define, with the body, an outer right angle and a pair of inner right angles, the inner right angles being normal to each other, each inner right angle having a first face and a second face; and a slot within the body and extending the length, the slot for slidably, non-rotatably retaining a nut and for housing a distal end of a bolt, the slot including an elongate opening defined by a proximal edge of each first face.

In the extruded corner bracket, the slot may be cylindrical and includes a step for housing a distal end of a bolt.

In the extruded corner bracket, the first faces may include a plurality of grooves running the length and the second faces may include a plurality of inward facing teeth running the length.

In the extruded corner bracket, the second faces each may include a U-shaped groove proximate a distal end of each wing.

In the extruded corner bracket, the body may define a void, the void extending the length of the extruded corner bracket.

In the extruded corner bracket, the distal end of each wing may be a soft end corner and the body may include a soft middle corner, the soft corners extending the length.

In another embodiment, a corner bracket assembly is provided, the corner bracket assembly comprising a single extrusion corner bracket; an at least one nut; an at least one bolt; and an at least one clamping block or clamping strip, the single extrusion corner bracket including: a length; a body and a pair of wings extending the length and defining an outer right angle and a pair of inner right angles, the inner right angles being normal to each other, each inner right angle having a first face and a second face; and a slot within the body and extending the length, the slot including an elongate opening defined by a proximal edge of each first face, the elongate opening extending the length, a first end and a second end, the slot slidably, non-rotatably retaining the nut and housing a distal end of the at least one bolt, the at least one bolt retaining the at least one clamping block or clamping strip.

In the corner bracket assembly, the first faces may include a plurality of grooves running the length and the second faces may comprise a plurality of inward facing teeth running the length.

In the corner bracket assembly the slot may be cylindrical and include a step for housing the distal end of the bolt.

The corner bracket assembly may further comprise an at least one angle bracket, the angle bracket retained by the at least one bolt.

The corner bracket assembly may further comprise an at least one threaded barrel retained in at least one of the first or second end of the cylindrical section.

The corner bracket assembly may further comprise a hinge, the hinge retained by the threaded barrel.

The corner bracket assembly may further comprise a plurality of stiffeners, a plurality of stiffener bolts and a plurality of bolts, the stiffeners for retaining a base with the stiffener bolts, the stiffeners retained on the corner brackets with the bolts and the nuts proximate at least one of the first and second end.

In the corner bracket assembly, the at least one wing may include a U-shaped groove proximate a distal end of the wing.

In another embodiment, a rectangular structure is provided, the rectangular structure comprising an at least four corner bracket assemblies, and at least four planar members, each corner bracket assembly including: an extruded corner bracket; a plurality of nuts; a plurality of bolts; and a plurality of clamping blocks or clamping strips, the extruded corner bracket including: a body and a pair of wings extending the length and defining an outer right angle and a pair of inner right angles, the inner right angles being normal to each other, each inner right angle having a first face and a second face; and a slot extending the length, the slot including: an elongate opening defined by a proximal edge of each first face, the elongate opening extending the length; a first end; and a second end, the slot slidably, non-rotatably retaining the nut and housing a distal end of the bolt, the at least four planar members each comprising a first end, a second end, a first side section proximate the first end and a second side section proximate the second end, each first end butted onto one first face, each second end butted onto another first face, a pair of first sides pressed between at least one clamping block or clamping strip and a pair of second faces and a pair of second sides pressed between another at least one clamping block or clamping strip and another pair of second face.

In the rectangular structure, the first faces may include a plurality of grooves running the length and the second faces may include a plurality of inward facing teeth running the length.

In the rectangular structure, the slot may be cylindrical and include a step for housing the distal end of the bolt.

The rectangular structure may further comprise an at least one threaded barrel retained in one or both of the first end and second end of the cylindrical section.

The rectangular structure may further comprise a lid and a hinge, the hinge retained on the threaded barrel and hingedly retaining the lid.

The rectangular structure may further comprise a base, a plurality of stiffeners, a plurality of stiffener bolts and a plurality of bolts, the stiffeners retaining the base with the stiffener bolts, the stiffeners retained on the corner brackets with the bolts and the nuts proximate the first or second end.

FIGURES

DESCRIPTION

Figure 1:
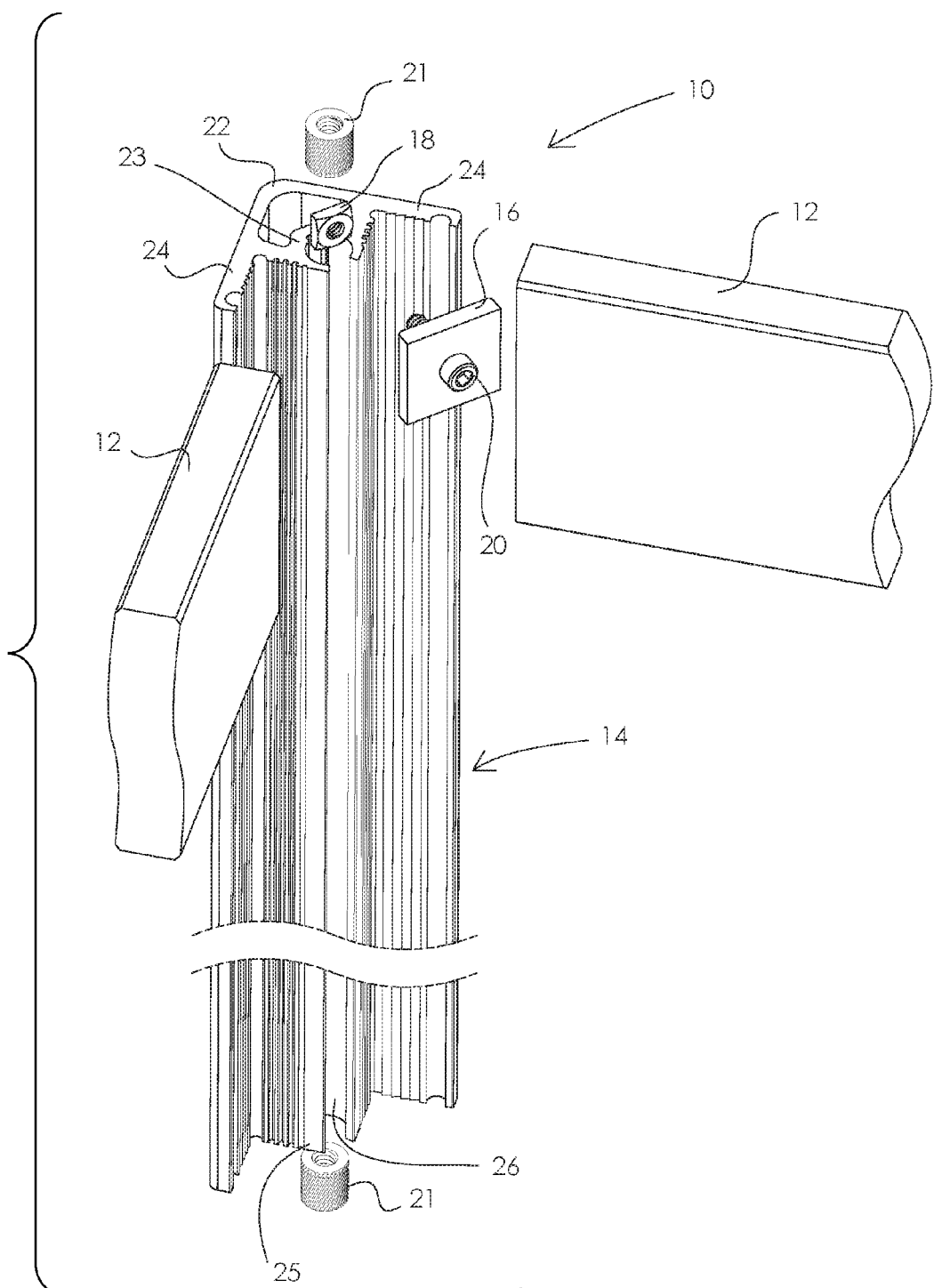
FIG. 1 is an exploded isometric view of the corner bracket assembly of the present technology showing two planks in the assembly.

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, The terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

DEFINITIONS

Rectangle—in the context of the present technology, a rectangle is any quadrilateral with four right angles.

Rectangular component—in the context of the present technology, a rectangular component is three dimensional and includes a rectangular two dimensional shape. A rectangular component could be, for example, but not limited to, the four walls of a storage container.

Rectangular component—in the context of the present technology, a rectangular component is three dimensional and includes a rectangular two dimensional shape. A rectangular component could be, for example, but not limited to, the four walls of a storage container.

Rectangular structure—in the context of the present technology, a rectangular structure is one that includes a rectangular component. A rectangular structure could be, for example, but not limited to, a box, a planter, a sign, or a box with a hinged lid. It is not necessarily restricted therefore to being entirely rectangular.

Plurality—in the context of the present technology, plurality is three or more.

DETAILED DESCRIPTION

A corner bracket assembly, generally referred to as 10 is shown in FIG. 1. The assembly 10 is for retaining a sheet, plank or panel 12. FIG. 1 shows two planks 12 at right angles to each other. The assembly 10 includes an aluminum extruded corner bracket, generally referred to as 14, a clamping block 16, a holder, which is preferably a nut 18, and a fastener, which is preferably a bolt 20. A threaded barrel 21 is housed in the corner bracket 14 in one or both of the first end 23 and second end 25. The threaded barrel 21 is preferably a knurled threaded barrel with the knurling on an outer surface. The corner bracket 14 has a body 22, two wings 24 and a slot 26. The slot 26 is in the body 22 and extends the length of the corner bracket 14.

Figure 2:
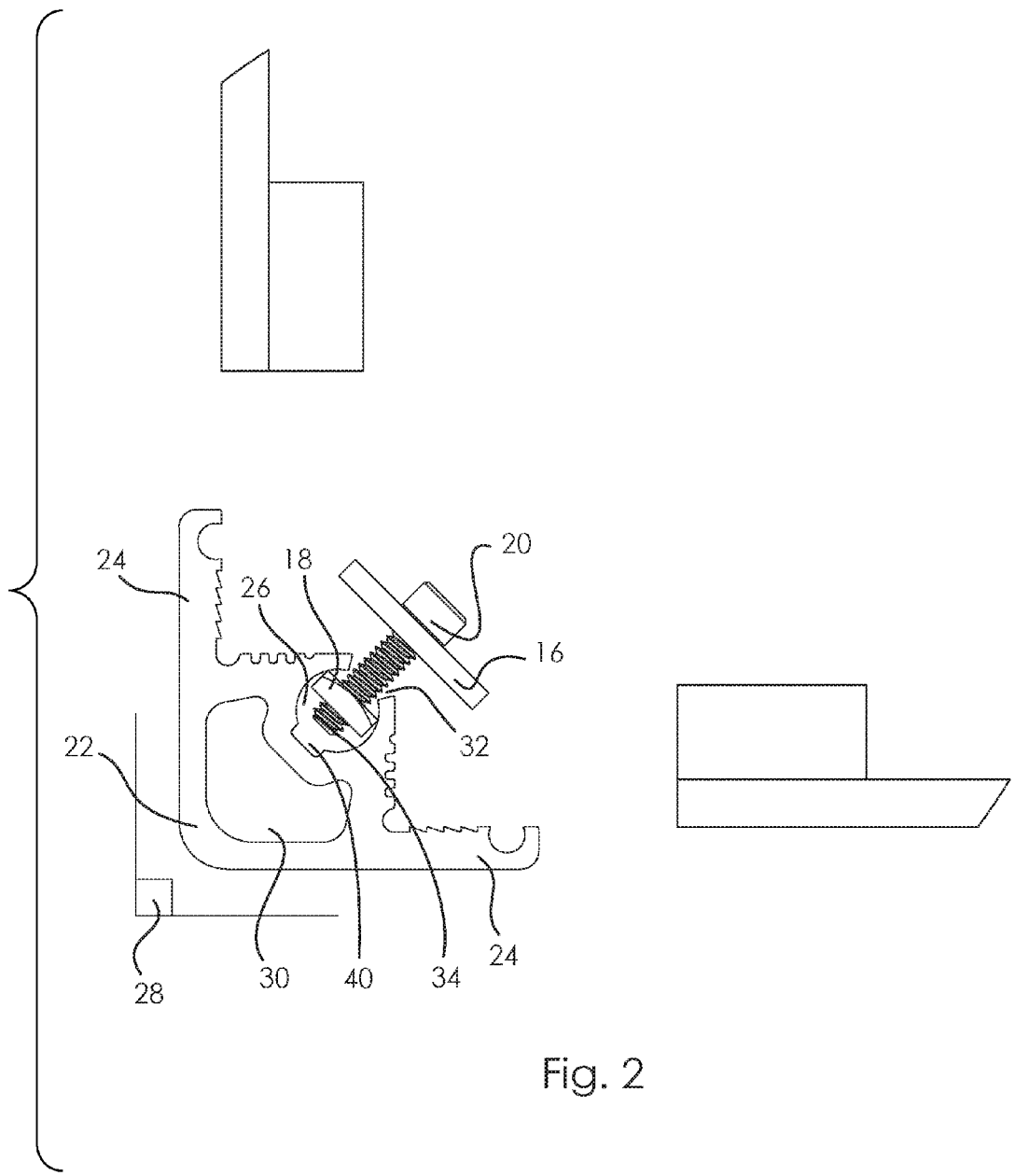
FIG. 2 is a top view of the corner bracket assembly.

As shown in FIG. 2, the body 22 and two wings 24 define an outer right angle 28. A void 30 in the body 22 reduces the amount of material used in manufacturing the corner bracket 14. The slot 26 is cylindrical with an elongate opening 32 that extends the length of the slot 26. The slot 26 is shaped to accept a nut 18 and a distal region 34 of the bolt 20. It is sized to slidably, non-rotationally engage the nut 18 and preferably has a step 40. In the preferred embodiment, the nut 18 has a 9 mm diameter at its smallest cross section and an 11 mm diameter at its widest cross section. The slot 26 is between 9 mm and 11 mm wide, such that the nut 18 can slide up and down, but cannot rotate. As would be known to one skilled in the art, any nut 18 can be slidably retained while preventing rotation by selecting the first section width to be slightly larger than the narrowest diameter of the nut 18 and smaller than the widest diameter of the nut 18. Square nuts and hex nuts can be employed using the same logic. The preferred nut 18 is a square 10-24 nut. This allows the bolt 20 to be tightened into the clamping block 16 without needing access to the nut 18. This allows one person to assemble structures without assistance. The threaded barrel 21 (shown in FIG. 1) is housed in the slot 26.

Figure 3:
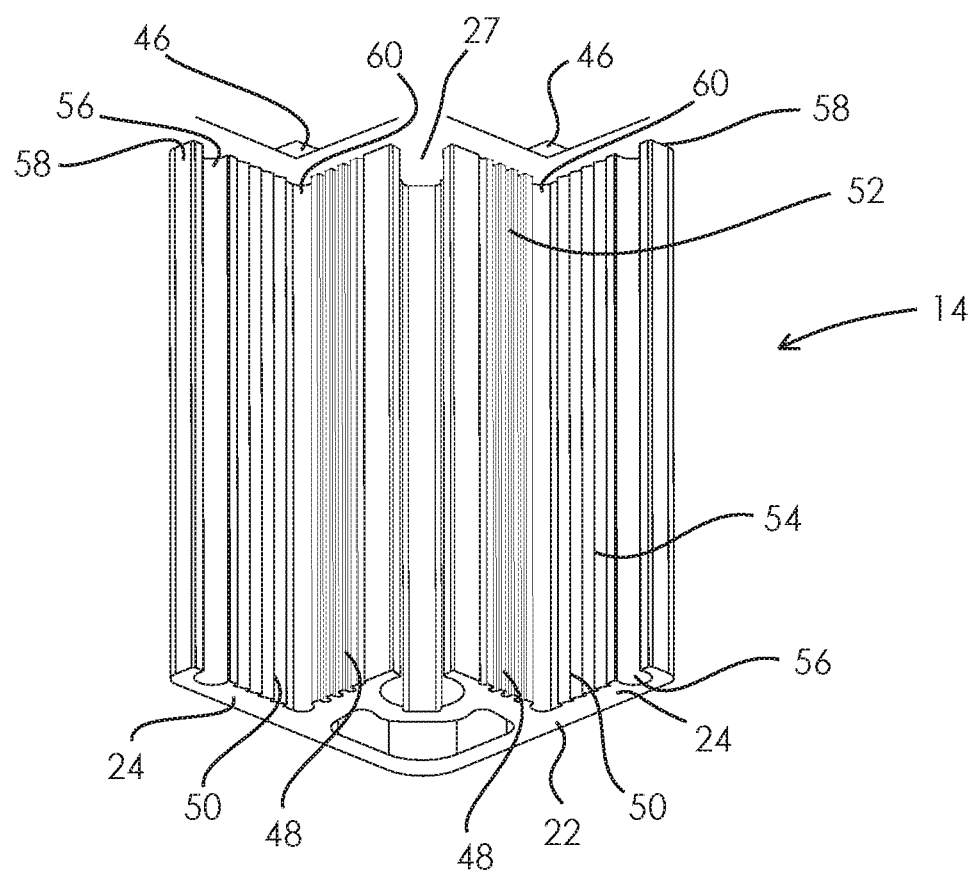
FIG. 3 is isometric view of the corner bracket assembly.

As shown in FIG. 3 the body 22 and wings 24 define two inner right angles 46 within the corner bracket 14 that are normal to each other. In each right angle 46, a first face 48 is on the body 22 and a second face 50 is on the wing 24. The proximal edges 49 of the first faces 48 define the elongate opening 27 of the slot 26. The first face 48 is provided with a series of grooves 52 that run the length of the body 22. The first face 48 is about 18 mm wide. The second face 50 is provided with a series of inward facing teeth 54 (angled in to the right angle) that run the length of the body 22. The second face 50 is about 20 mm wide. A first U groove 56 is proximate the distal edge 58 of the wing 24. A second U groove 60 is at the junction of the first 48 and second face 50—in other words, at the angle 46.

Figure 4:
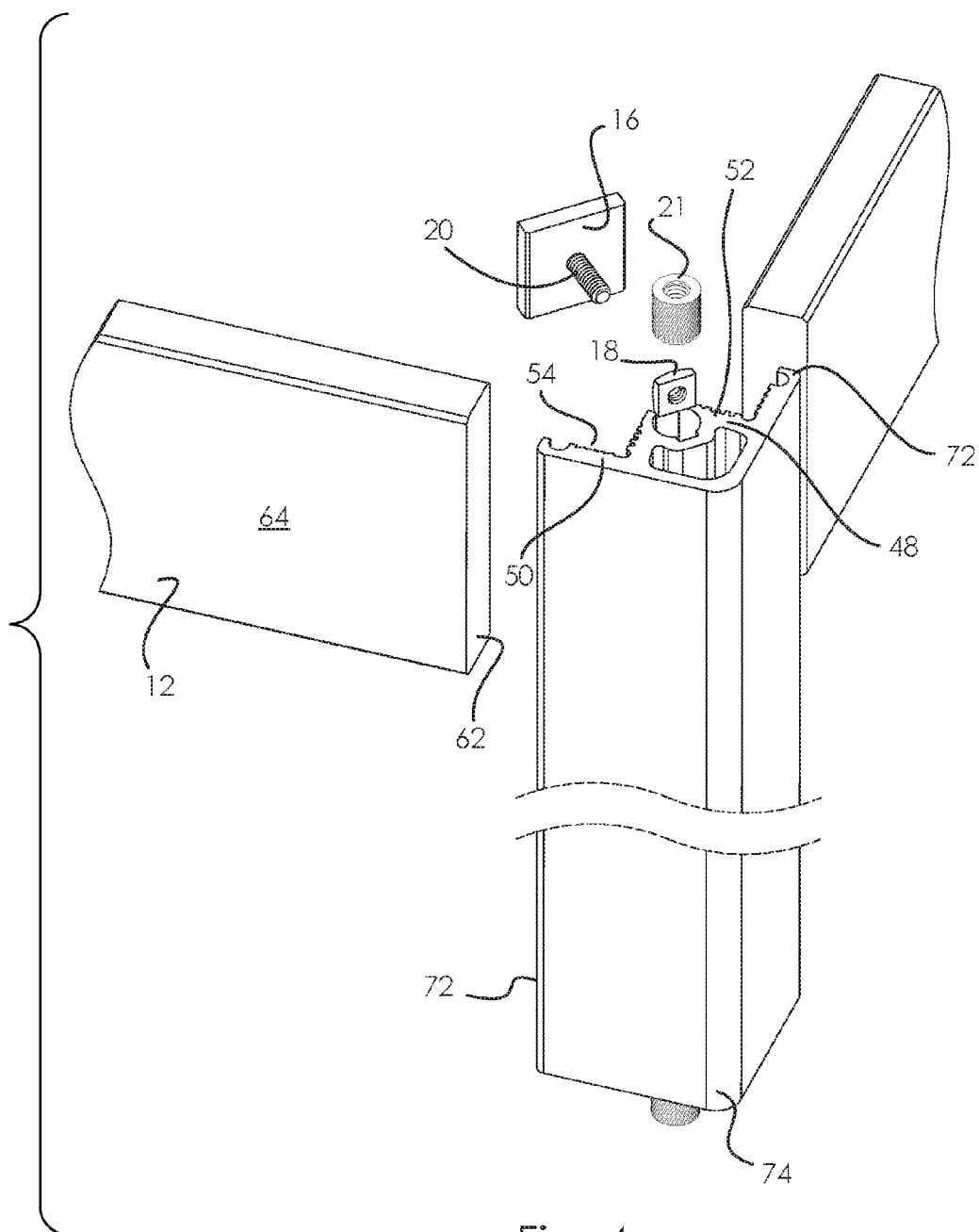
FIG. 4 is an exploded isometric back view of the corner bracket assembly and two panels showing the various surfaces.
Figure 6:
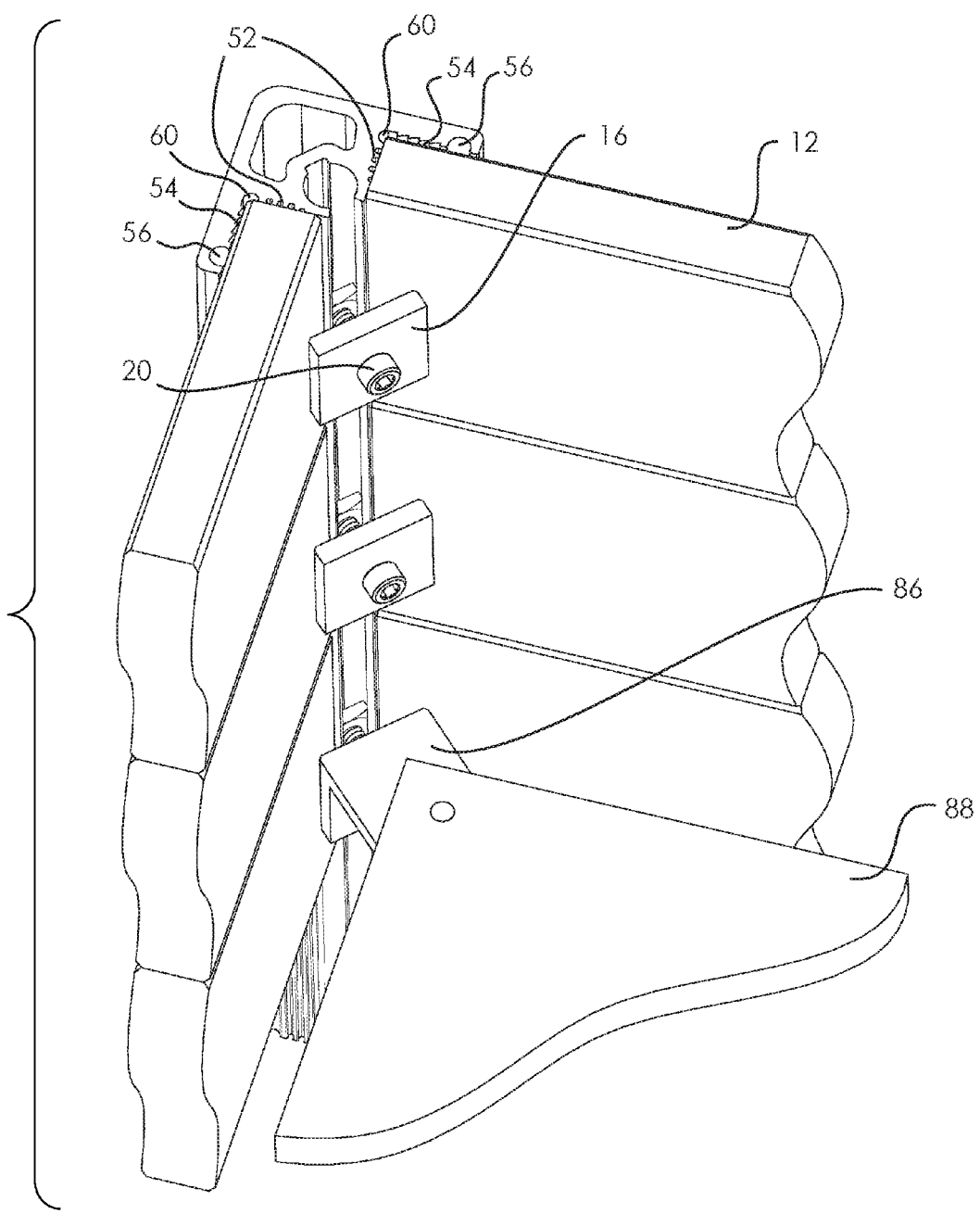
FIG. 6 is an exploded isometric view of the corner bracket assembly with angle brackets and stubs for retaining shelves, bases or tops.

As shown in FIGS. 4 and 6, the clamping block 16 presses the end 62 of the sheets 12 into the first face 48 and the sides 64 of the sheets 12 proximate the end 62 into the second face 50. The grooves 52 in the first face 48 allow for compression and molding of the ends 62 of the sheets 12, if they are wood, or wood paneling or planks, to form a substantially watertight connection and one that will minimize leakage of soil or other contents. The teeth 54 in the second face 50 press into the sides 64 of the sheets, holding them in place and again forming a substantially watertight connection and one that will minimize leakage of soil or other contents. The outer surface of the corner bracket has soft end corners 72, and a soft middle corner 74. These are to reduce the chance of the corner bracket catching clothing or scraping someone passing by.

Figure 5:
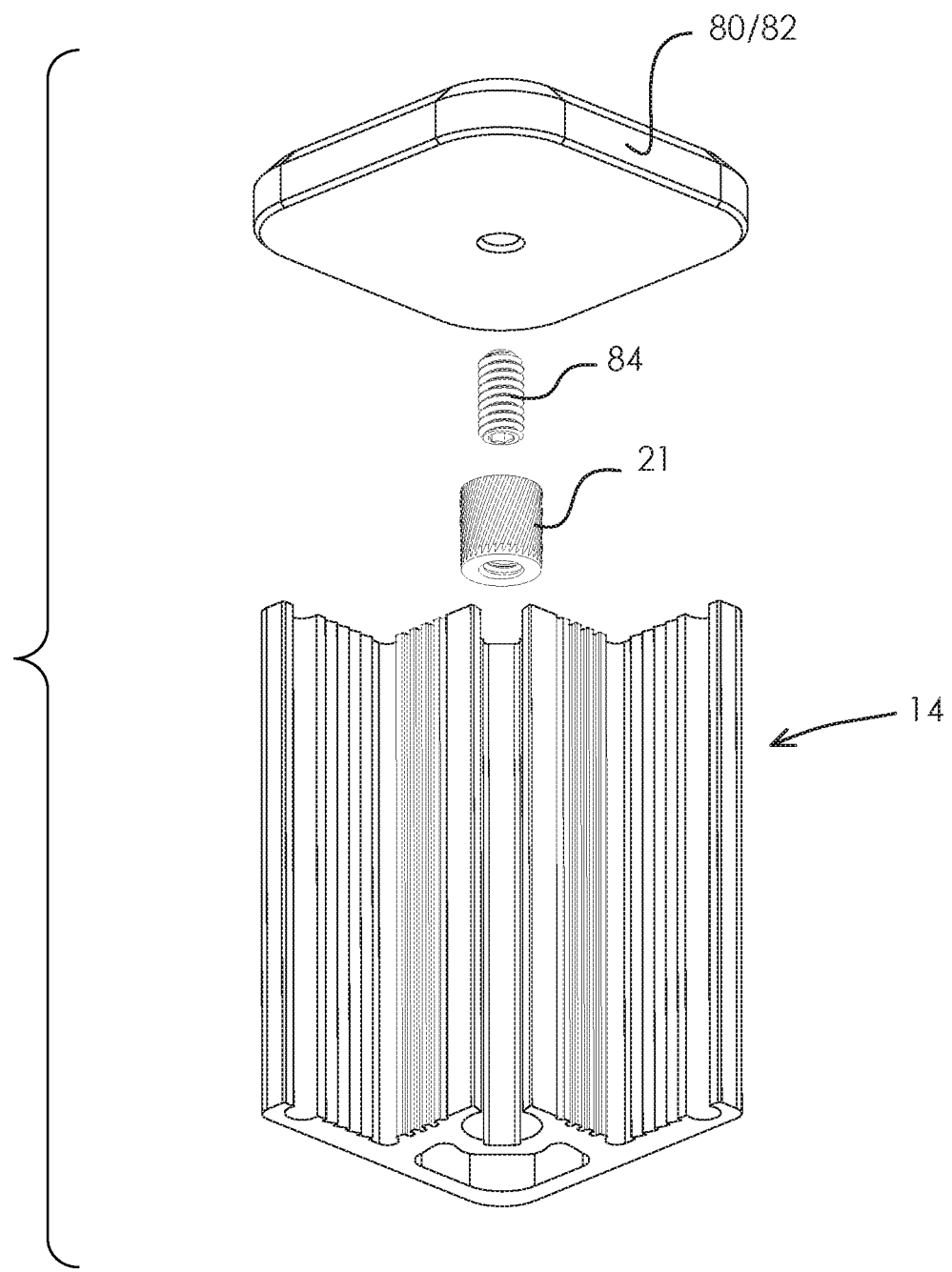
FIG. 5 is exploded partial view of the corner bracket assembly with an end cap and a caster.

As shown in FIG. 5, an end cap 80 or caster/feet 82 has a threaded member 84 for threading into the threaded barrel 21. The end cap 80 protects the corner bracket 10 from water, dirt and the like and finishes the corner bracket off. The caster 82 allows for leveling of the structure.

As shown in FIG. 6, angle brackets 86 may replace one or more of the clamping blocks 16. The angle brackets 86 are similarly affixed with nuts 18 and bolts 20. These are for retaining a top 88 or a shelf 88 or a base 92.

Figure 7:
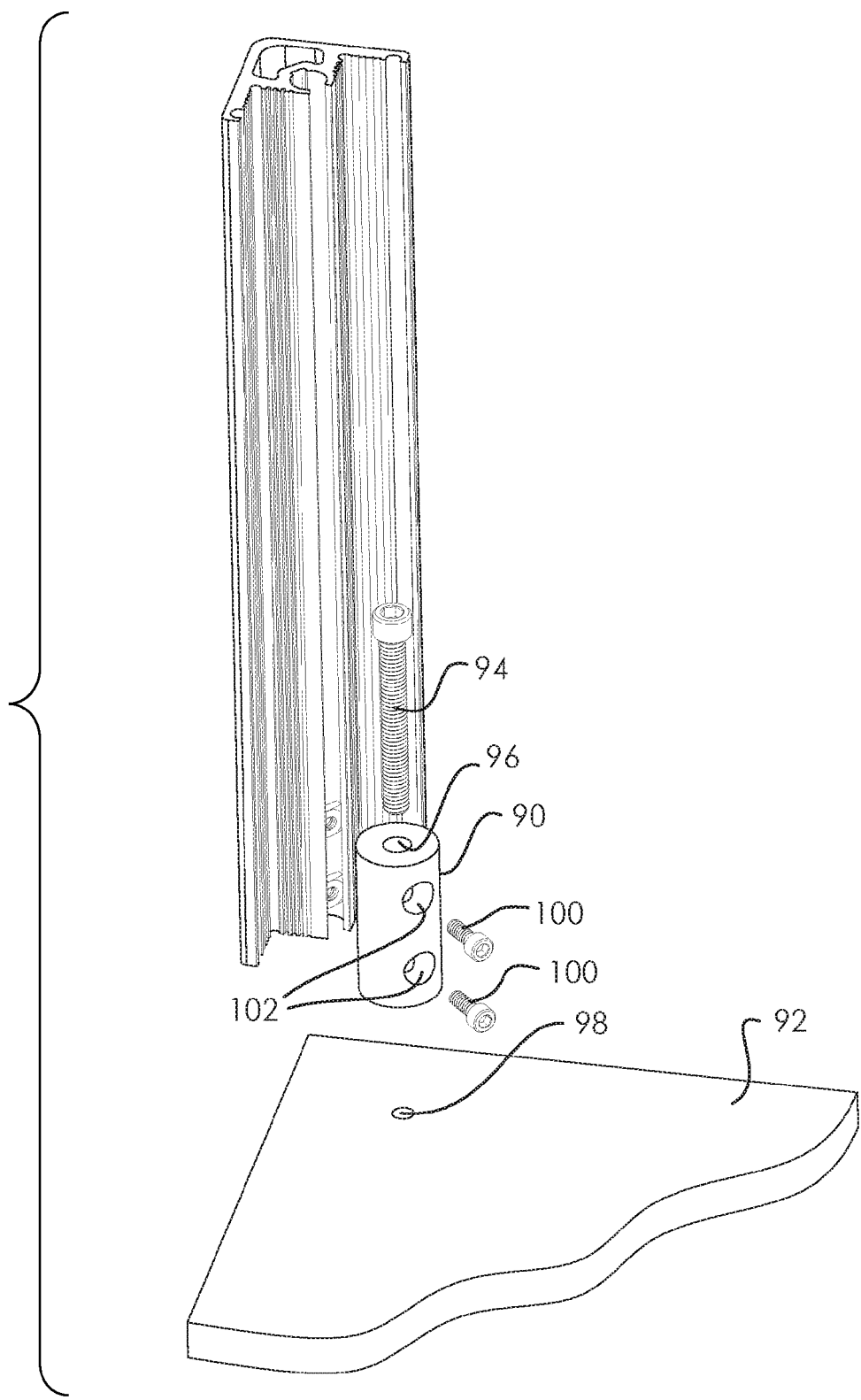
FIG. 7 is an exploded view of the corner bracket assembly with stiffener.
Figure 8:
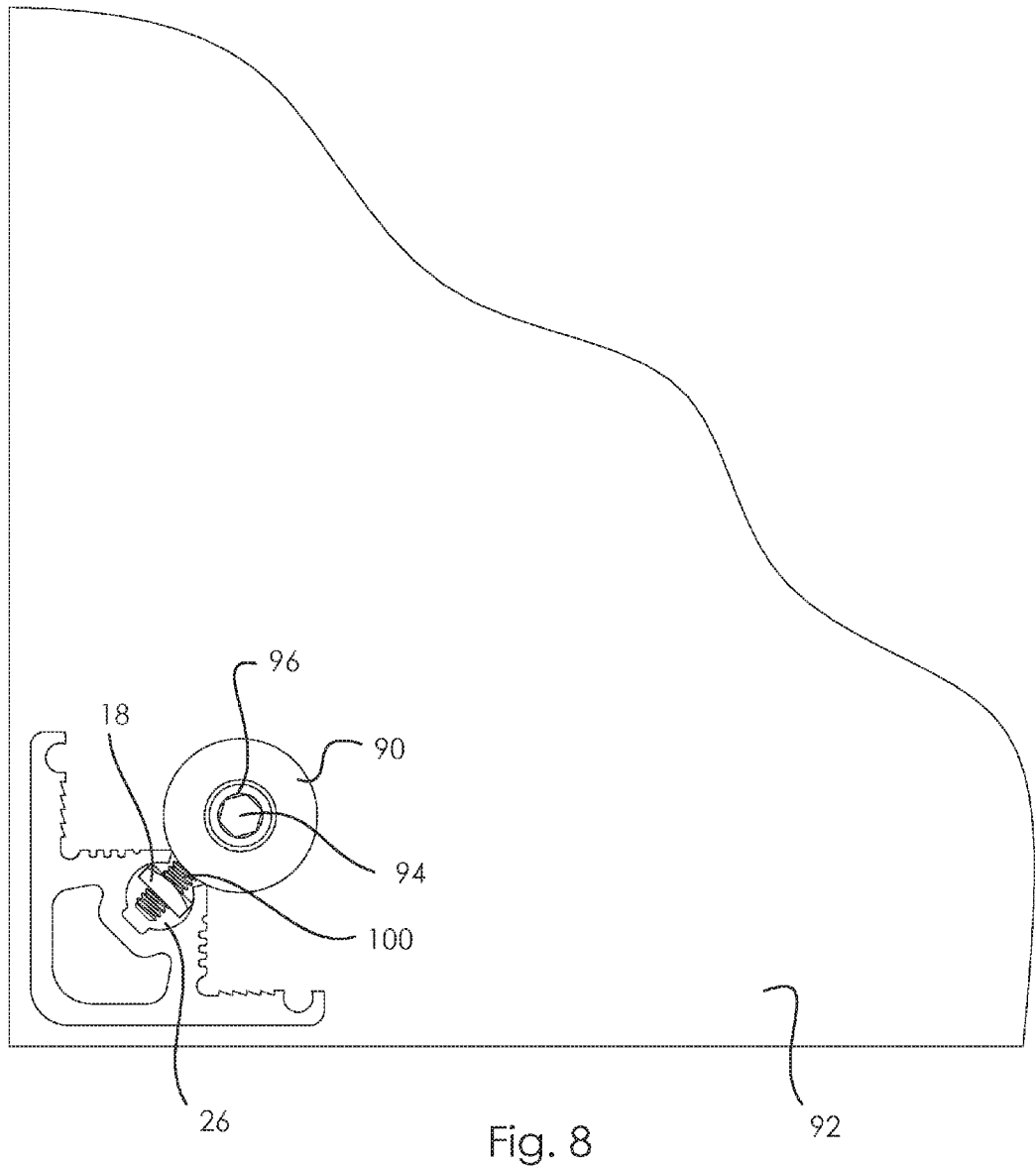
FIG. 8 is a plan view of the corner bracket assembly with stiffener.

As shown in FIG. 7, a stiffener 90, which is preferably about 1 inch in outside diameter and about 3 inches long is used to stiffen the joint between a base 92 and the corner bracket 14. The stiffener 90 is attached to the base 92 with a fastening bolt 94 that extends through the central bore 96 of the stiffener 90 and through an aperture 98 of the base 92. It is attached to the corner bracket 14 with two bolts 100 that extend through counterbored stiffener apertures 102 that are normal to the central bore 96, to the nuts 18 in the slot 26. This can also be seen in FIG. 8.

Figure 9:
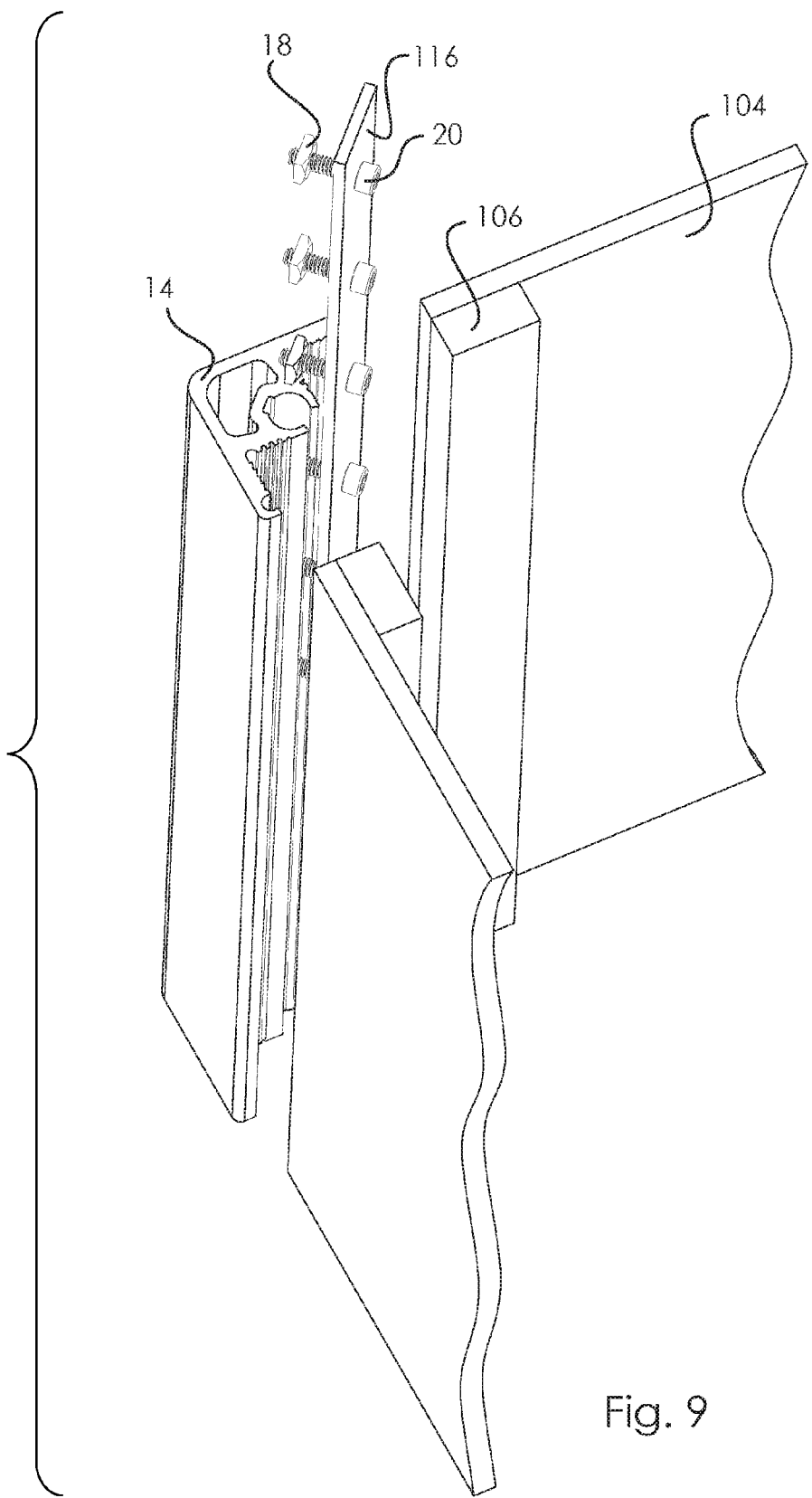
FIG. 9 is an exploded view of an alternative embodiment of the kit of the present technology.

An alternative embodiment for one piece walls 104 (or fewer piece walls than, for example, a plank wall) is shown in FIG. 9. If the walls 104 are thin, a strip 106 is used for furring out the wall 104. The clamping blocks 16 are replaced with a clamping strip 116. This strip 116 may run the length of the corner bracket 14 or may be cut in shorter lengths. The assembly is the same as for the embodiment that employs the clamping blocks 16.

Figure 10:
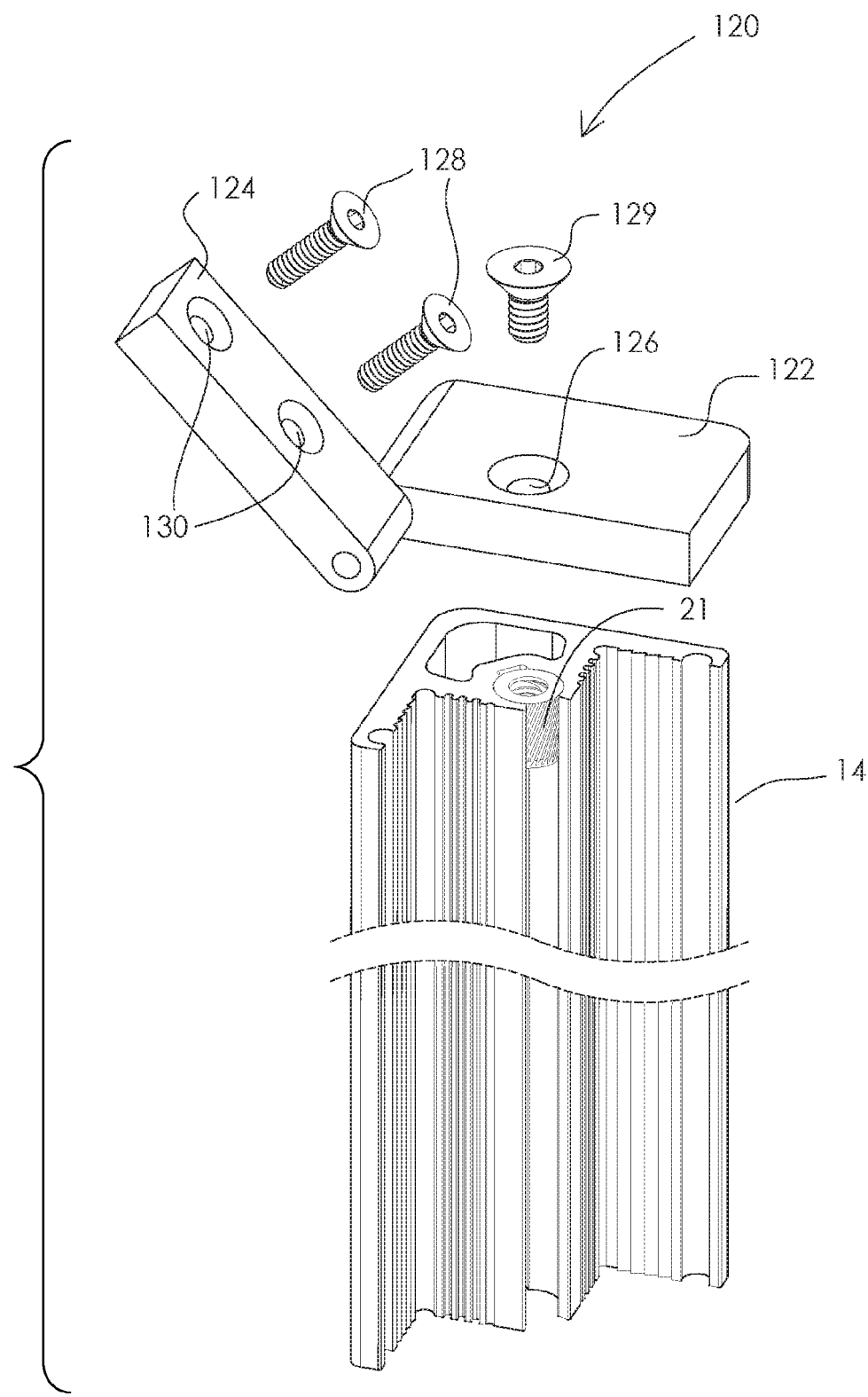
FIG. 10 is an exploded view of a hinge.
Figure 11:
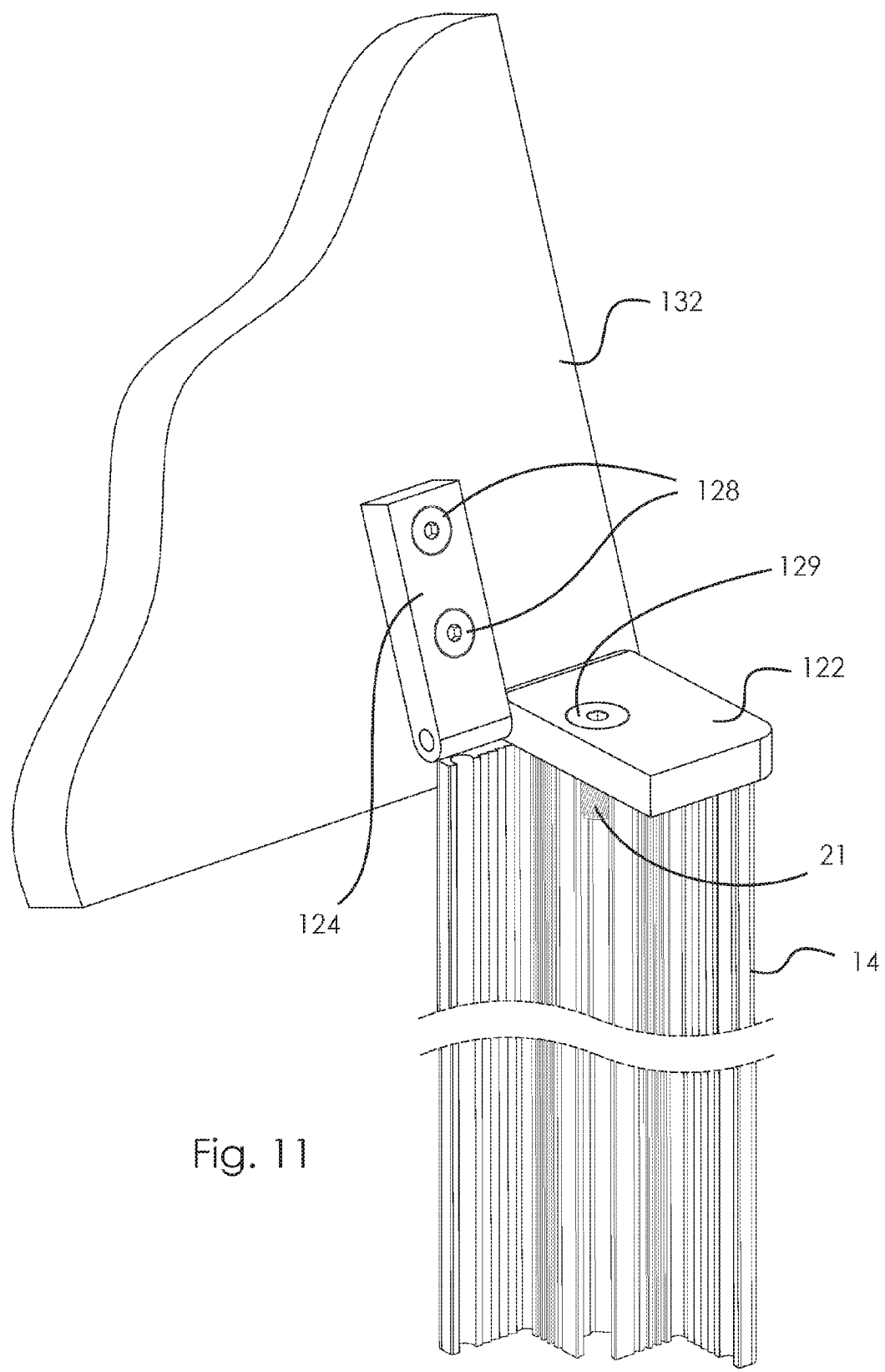
FIG. 11 is a perspective view of a lid attached to the corner bracket with the hinge.

FIG. 10 is an exploded view of a hinge, generally referred to as 120. The hinge has a base member 122 for attachment to the corner bracket 14 and an articulating member 124 for attachment to a top 88, which can then function as a lid. The base member has an aperture 126 that aligns with the threaded member 21 so that it can be bolted down with a bolt 129. The articulating member has two apertures 130 for attaching it to the lid with two bolts 128. The assembly with a lid 132 is shown in FIG. 11.

Figure 12:
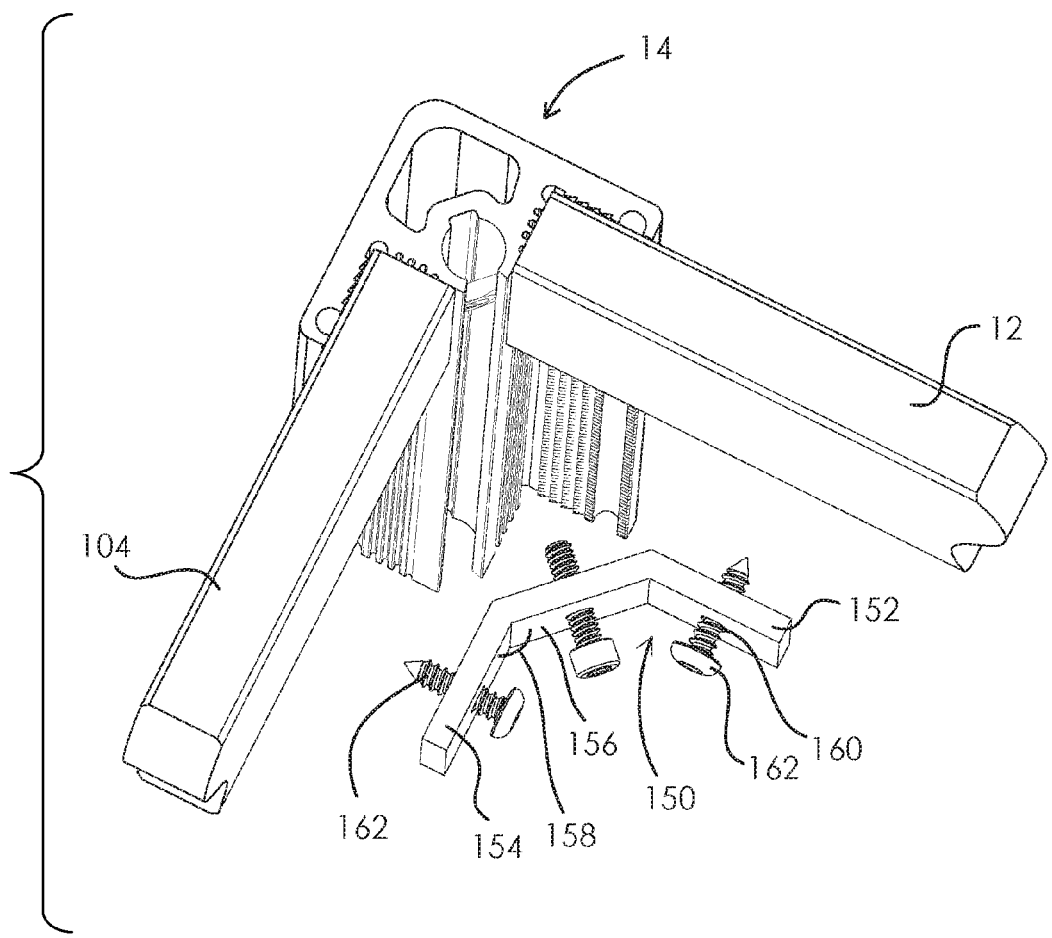
FIG. 12 is a view of the corner bracket assembly with a modified clamping block.

As shown in FIG. 12, a modified clamping block 150 has a right extension 152 and a left extension 154. The extensions 152, 154 are at an angle 158 of 120 degrees to the body 156 of the clamping block 150. One or more apertures 160 are located in the extensions 152, 154. The apertures are to accept screws 162 for further retaining the sheets, planks or panels 12 or one piece walls 104.

Figure 13:
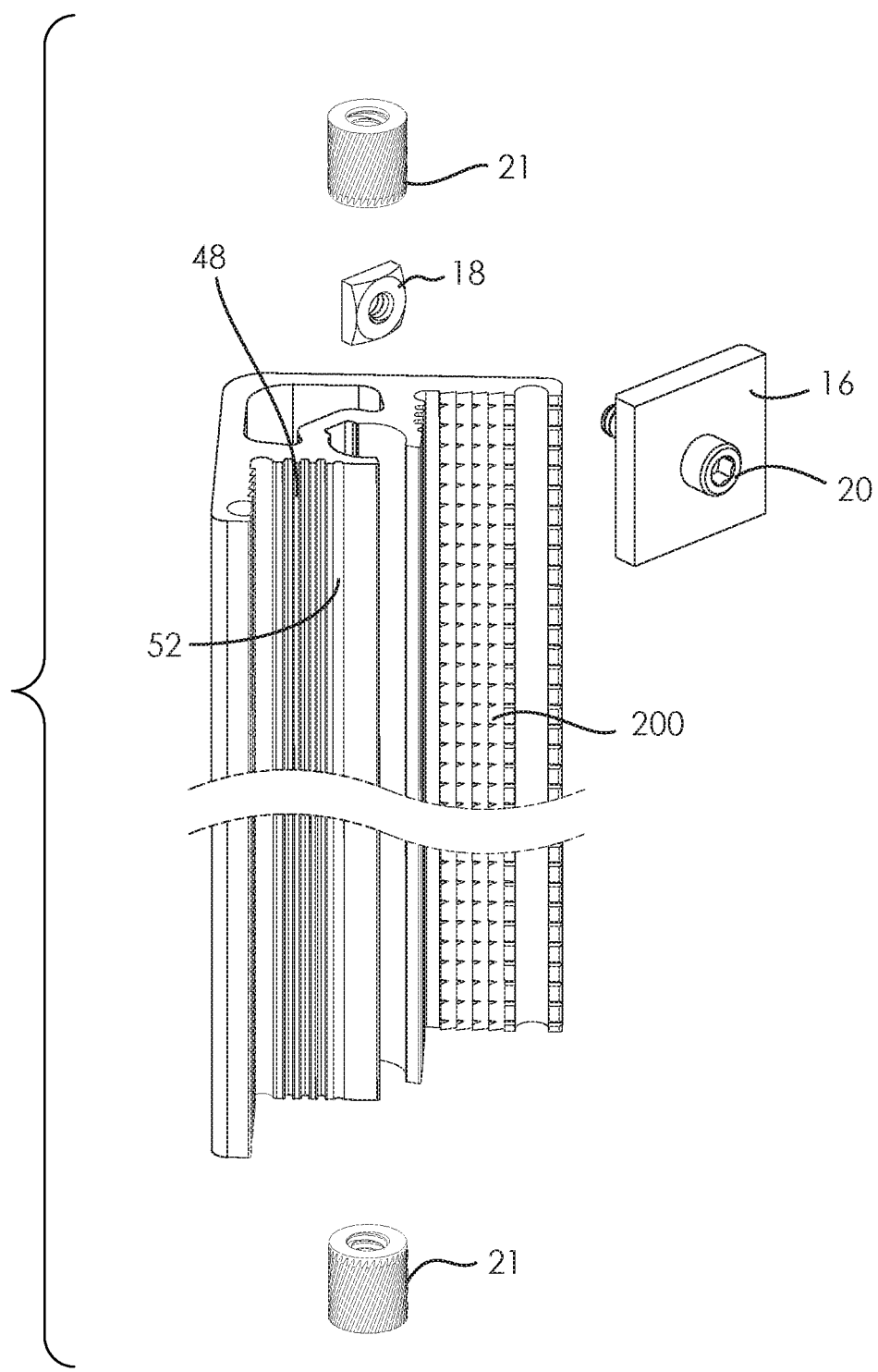
FIG. 13 is an exploded view and shows serrations in the extruded corner bracket.

As shown in FIG. 13, the grooves 52 in the first face 48 and the teeth 54 in the second face 50 have serrations 200 that are normal to the grooves 52. These provide a higher surface area and more sharp edges to retain the sheets, plank or panels 12 or the one piece walls 104.

The corner bracket assembly 10 may be sold in a kit. The kit includes the corner brackets 14, the clamping blocks or strips 16, nuts 18, bolts 20, and optionally angle brackets 86, threaded barrels 21 and instructions. The kit optionally also includes end caps 80, caster/feet 82 and planar material, for example, but not limited to glass, plywood, board, tile, planks and plexiglass. Bumpers may be provided to cushion the material. The corner bracket 14 can be provided as a single length for cutting to size on site, or can be provided in predetermined lengths. The corner bracket 14 is for running at least the height of the structure.

The kits may be assembled into, for example, but not limited to, boxes, planters, benches, combinations of planters, combinations of benches and planters, shelves, outbuildings, temporary housing, outhouses, driveway lighting, patio lighting, and house number pillars.

Many different rectangular structures can be built using the corner bracket assembly 10, for example, but not limited to planters, seats, a series of planters joined together, planters and seats joined together, desks, and display panels.

The method of constructing a structure can be readily understood from the foregoing as can the use of the assembly in constructing structures, as the components are sequentially attached to the corner bracket, with the planar material being pressed into the corner bracket by the various components, and, in the situation where there is a base, the base material is located on the angle bracket or on stubs extending from the clamping blocks.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. For example, as would be known to one skilled in the art, the size of the corner bracket 10 can be scaled to accommodate thicker or thinner planar materials. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. An extruded corner bracket, the corner bracket comprising a length; a body extending the length; a pair of wings extending the length and extending outward from the body to define, with the body, an outer right angle and a pair of inner right angles, the inner right angles being normal to each other, each inner right angle having a first face and a second face; and a slot within the body and extending the length, the slot for slidably and non-rotatably retaining a nut, wherein the slot is cylindrical and includes both, an elongate opening defined by a proximal edge of each first face and a step for housing a distal end of a bolt.

2. The extruded corner bracket of claim 1, wherein each of the first faces include a plurality of grooves running the length and each of the second faces include a plurality of inward facing teeth running the length.

3. The extruded corner bracket of claim 2, wherein each of the second faces include a U-shaped groove proximate a distal end of the wing.

4. The extruded corner bracket of claim 3, wherein the body defines a void, the void extending the length.

5. The extruded corner bracket of claim 4, wherein the distal end of each wing is a rounded corner and the body includes a rounded middle corner, the rounded corners extending the length of the extruded corner bracket.

6. A corner bracket assembly, the corner bracket assembly comprising a single extrusion corner bracket; an at least one nut; an at least one bolt; and an at least one clamping block or clamping strip, the single extrusion corner bracket including: a length; a body and a pair of wings extending the length and defining an outer right angle and a pair of inner right angles, the inner right angles being normal to each other, each inner right angle having a first face and a second face; and a slot within the body and extending the length, the slot including an elongate opening defined by a proximal edge of each first face, the elongate opening extending the length, a first end and a second end, wherein the slot is cylindrical and includes a step housing the distal end of the at least one bolt, the slot slidably and non-rotatably retaining the nut, the at least one bolt retaining the at least one clamping block or clamping strip.

7. The corner bracket assembly of claim 6, wherein each of the first faces include a plurality of grooves running the length and each of the second faces include a plurality of inward facing teeth running the length.

8. The corner bracket assembly of claim 7, further comprising an at least one angle bracket, the angle bracket retained by the at least one bolt.

9. The corner bracket assembly of claim 7, further comprising an at least one threaded barrel retained in at least one of the first or second end of the slot.

10. The corner bracket assembly of claim 9, further comprising a hinge, the hinge retained by the threaded barrel.

11. The corner bracket assembly of claim 10, further comprising at least one stiffener, at least one a stiffener bolt and at least one nut and bolt, the stiffener for retaining a base with the stiffener bolt, the stiffener retained on the corner brackets with the bolt and the nut proximate at least one of the first and second end of the corner bracket.

12. The corner bracket assembly of claim 11, wherein at least one wing of the pair of wings includes a U-shaped groove proximate a distal end of the wing.

13. A rectangular structure, the rectangular structure comprising at least four corner bracket assemblies, at least one threaded barrel and at least four planar members, each corner bracket assembly including: an extruded corner bracket; a plurality of nuts; a plurality of bolts; and a plurality of clamping blocks or clamping strips, the extruded corner bracket including: a body and a pair of wings extending the length and defining an outer right angle and a pair of inner right angles, the inner right angles being normal to each other, each inner right angle having a first face and a second face; and a slot extending the length, the slot including: an elongate opening defined by a proximal edge of each first face, the elongate opening extending the length; a first end; and a second end, the slot slidably and non-rotatably retaining the nut, housing a distal end of the bolt, and retaining the at least one threaded barrel in one or both of the first end and second end of the slot, the at least four planar members each comprising a first end, a second end, a first side section proximate the first end and a second side section proximate the second end, each first end butted onto one first face, each second end butted onto another first face, a pair of first sides pressed between at least one clamping block or clamping strip and a pair of second faces and a pair of second sides pressed between another at least one clamping block or clamping strip and another pair of second face.

14. The rectangular structure of claim 13, wherein each of the first faces include a plurality of grooves running the length and each of the second faces include a plurality of inward facing teeth running the length.

15. The rectangular structure of claim 14, wherein the slot is cylindrical and includes a step for housing the distal end of the bolt.

16. The rectangular structure of claim 15, further comprising a lid and a hinge, the hinge retained on the threaded barrel and hingedly retaining the lid.

17. The rectangular structure of claim 16, further comprising at least one stiffener, at least one a stiffener bolt and at least one nut and bolt, the stiffener for retaining a base with the stiffener bolt, the stiffener retained on the corner brackets with the bolt and the nut proximate at least one of the first and second end of the corner bracket.

* * * * *